United States Patent [19]
Johnson

[11] Patent Number: 5,704,767
[45] Date of Patent: Jan. 6, 1998

[54] INTEGRAL PUMP AND FLOW METER DEVICE

[75] Inventor: Paul A. Johnson, Vancouver, Wash.

[73] Assignee: Micropump Corporation, Vancouver, Wash.

[21] Appl. No.: 808,479

[22] Filed: Mar. 3, 1997

Related U.S. Application Data

[63] Continuation of Ser. No. 371,240, Jan. 11, 1995.

[51] Int. Cl.$^6$ ............................................. F04B 49/00
[52] U.S. Cl. ........................... 417/43; 417/63; 418/2; 73/261
[58] Field of Search .................... 418/2, 40, 206.1, 418/206.5; 417/212; 73/229

[56] References Cited

U.S. PATENT DOCUMENTS

| | | | |
|---|---|---|---|
| 1,137,927 | 5/1915 | Thomas . | |
| 1,477,850 | 12/1923 | Pool . | |
| 2,083,167 | 6/1937 | Lamere . | |
| 2,349,310 | 5/1944 | Schnell . | |
| 2,543,941 | 3/1951 | Sargent . | |
| 2,651,995 | 9/1953 | Blackburn . | |
| 2,696,266 | 12/1954 | Tuve . | |
| 2,750,891 | 6/1956 | Berry | 418/200 |
| 2,936,835 | 5/1960 | Sheppard . | |
| 3,223,040 | 12/1965 | Dinkelkamp . | |
| 3,552,603 | 1/1971 | Hrivak et al. . | |
| 3,584,977 | 6/1971 | Coleman et al. . | |
| 3,633,420 | 1/1972 | Holzem . | |
| 3,714,988 | 2/1973 | Livingston . | |
| 3,771,906 | 11/1973 | Bourke | 418/48 |
| 4,042,149 | 8/1977 | Main | 222/40 |
| 4,246,969 | 1/1981 | McLoughlin et al. . | |
| 4,278,132 | 7/1981 | Hostetter . | |
| 4,324,294 | 4/1982 | McLoughlin et al. . | |
| 4,328,824 | 5/1982 | Kiernan et al. | 418/200 |
| 4,409,829 | 10/1983 | Weber . | |
| 4,448,256 | 5/1984 | Eberhardt et al. . | |
| 4,467,652 | 8/1984 | Olsson | 73/861 |
| 4,527,054 | 7/1985 | White | 250/227 |
| 4,568,248 | 2/1986 | Harders . | |
| 4,705,459 | 11/1987 | Buisine et al. | 417/53 |
| 4,824,342 | 4/1989 | Buck . | |
| 4,878,454 | 11/1989 | Cann . | |
| 4,899,825 | 2/1990 | Bosoni et al. . | |
| 4,925,370 | 5/1990 | Tallarita . | |
| 4,985,181 | 1/1991 | Strada et al. | 261/87 |
| 5,050,094 | 9/1991 | Kitano | 364/510 |
| 5,092,824 | 3/1992 | Connett . | |
| 5,096,390 | 3/1992 | Sevrain et al. | 417/420 |
| 5,125,806 | 6/1992 | Quick et al. . | |
| 5,145,014 | 9/1992 | Eberhardt . | |
| 5,169,292 | 12/1992 | Loubier et al. | 417/63 |
| 5,174,383 | 12/1992 | Haugen et al. . | |
| 5,195,873 | 3/1993 | Claussen et al. | 417/18 |
| 5,232,052 | 8/1993 | Arvidson et al. . | |

(List continued on next page.)

FOREIGN PATENT DOCUMENTS

| | | | |
|---|---|---|---|
| 0 179 713 A1 | 4/1986 | European Pat. Off. . | |
| 2 669 969 | 6/1992 | France . | |
| 57-389 | 1/1982 | Japan | 418/200 |

*Primary Examiner*—Timothy Thorpe
*Assistant Examiner*—Xuan M. Thai

[57] ABSTRACT

A pump housing is provided with a conduit extending through the housing between a pump inlet and pump outlet. A pump device is disposed within the housing and in communication with the conduit to pump fluid therethrough. A fluid flow meter also is disposed within the housing and in communication with the conduit to monitor fluid flow rate through the conduit. The fluid flow meter generates signals related to the fluid flow rate which are fed back to a control device operable to control the flow rate through the pump device. The flow meter may include a pair of meshed modified elliptical gears. The modified elliptical gears are based on a true elliptical shape, with bulged portions added between the major and minor axes of the elliptical shape. The modified elliptical gears have involute teeth that are relatively thick adjacent the minor axis and relatively thin adjacent the major axis.

32 Claims, 4 Drawing Sheets

U.S. PATENT DOCUMENTS

| | | | |
|---|---|---|---|
| 5,242,271 | 9/1993 | Quarve et al. | 417/46 |
| 5,248,245 | 9/1993 | Behnke et al. | 417/369 |
| 5,255,747 | 10/1993 | Teske et al. | |
| 5,257,919 | 11/1993 | Lew. | |
| 5,290,602 | 3/1994 | Argyropoulos et al. | 427/421 |
| 5,291,951 | 3/1994 | Morand. | |
| 5,304,001 | 4/1994 | Kuo et al. | 366/132 |
| 5,313,548 | 5/1994 | Arvidson et al. | |
| 5,362,519 | 11/1994 | Argyropoulos et al. | 427/385.5 |
| 5,393,203 | 2/1995 | Hantle | 417/410.4 |
| 5,403,089 | 4/1995 | Kuo et al. | 366/132 |
| 5,411,100 | 5/1995 | Laskaris et al. | |
| 5,545,871 | 8/1996 | Carr | 219/69.17 |

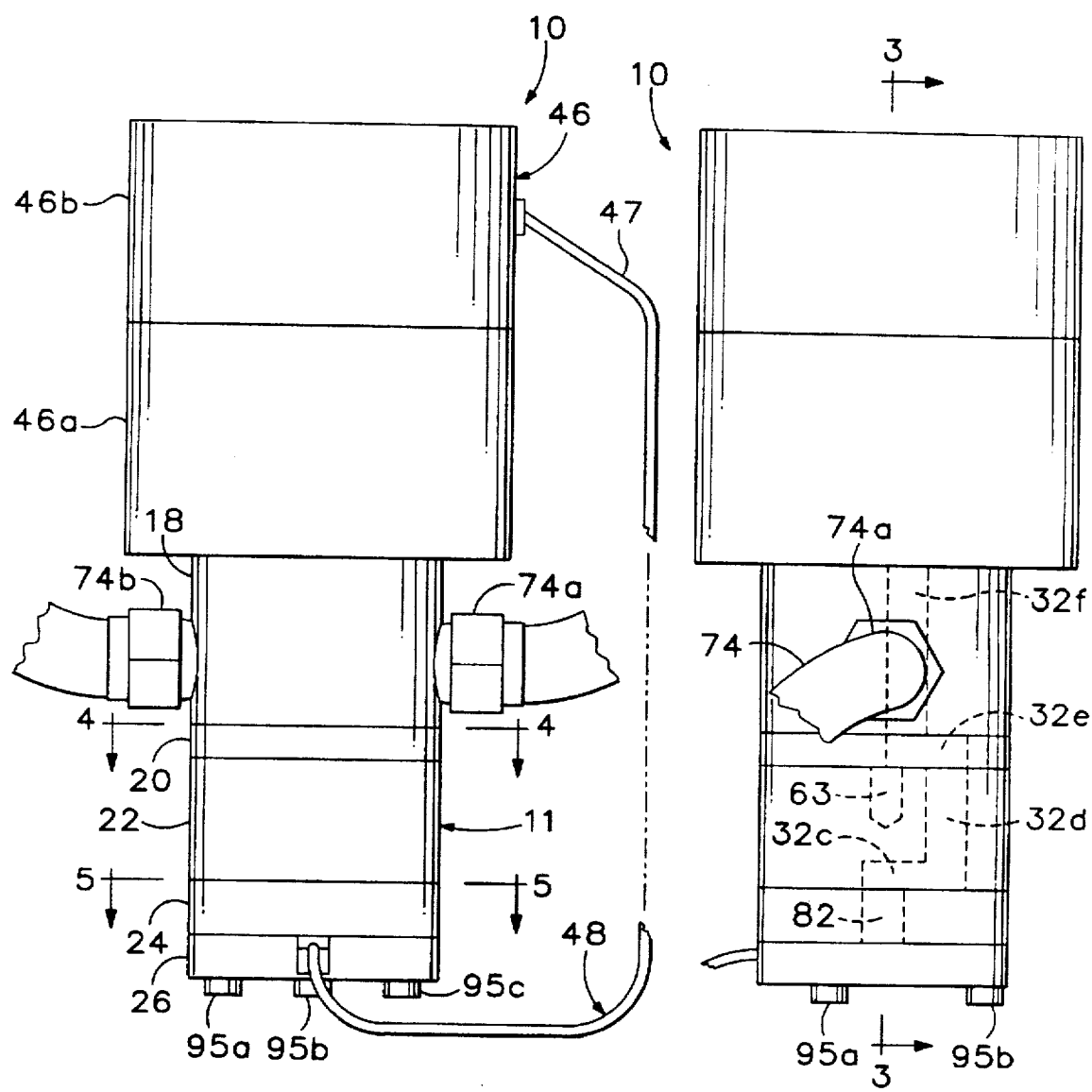

INTEGRAL PUMP AND FLOW METER DEVICE

This is a continuation, of application Ser. No. 08/371, 240, filed Jan. 11, 1995.

FIELD OF THE INVENTION

The present invention relates to pumps, and more particularly, to a pump integrally housed with a flow meter to monitor the rate of flow through the pump.

BACKGROUND AND SUMMARY OF THE INVENTION

In pump applications, often it is desirable to be able to monitor and accurately control the fluid flow rate through the pump. Pumping devices exist that provide flow control in some applications. However, these devices have limitations that may yield unsatisfactory performance.

For instance, pump devices exist that estimate the pump flow rate based upon the rotation rate of a rotating pump member, such as a gerotor. With the flow rate so estimated, the pump speed is controlled to produce the desired fluid flow rate. Unfortunately, such pump devices usually are limited to providing accurate flow rate monitoring and control only over a narrow range of fluid viscosity and pump flow rates. Such limitation is partly based upon a condition known as "deadhead." At deadhead, an excessive pressure drop prevents the pump from pumping fluid through the pump. For instance, in a gear pump such deadhead pressure drop forces fluid upstream between the meshed teeth of the pump gears. The leakage flow is effectively equal to the volumetric displacement of the pump. At such deadhead, flow rate estimation based upon the pump member rotation rate yields an erroneous fluid flow rate measurement.

Flow rate monitoring based upon the rotation of a pump member also may be inaccurate when fluids of differing viscosity are pumped. For instance, at a given pump member rotation rate in a gear pump, low-viscosity fluids tend to be pumped at lower flow rates than do high-viscosity fluids. Thus, flow monitoring based upon pump member rotation rates requires particular calibration for particular pumped fluid viscosities. Deviation in fluid viscosity from that on which the calibration is based tends to cause inaccurate flow rate readings.

Other pump control schemes utilize independent flow meters that are externally connected with pumps in order to monitor the pump flow rate. Such assemblies of pumps and flow meters generally are not entirely satisfactory in that they are relatively bulky and expensive. Moreover, the additional connection in the fluid line between the pump and flow meter may yield a greater probability of fluid line leakage.

Furthermore, flow meters themselves may produce erroneous flow rate readings due to leakage of fluid through the flow meter components. For instance, flow meters may be equipped with pairs of conventional elliptical gears that are meshed such that the gear major axes become perpendicular to each other at 90° intervals during gear rotation. Unfortunately, such elliptical gears often tend to permit fluid leakage between the meshed teeth of the pair of gears. Leakage between the meshed gears becomes most pronounced as the gears rotate through positions where the gear major axes are oriented parallel to each other. At such points, a gap tends to form between the meshed teeth of the conventional elliptical gears, loosening the meshing and permitting leakage. Such leakage tends to increase as pumped fluid viscosity decreases, thereby yielding increasingly erroneous flow rate readings as fluid viscosity decreases.

In light of the disadvantages of the prior art, a primary goal of the present invention is to provide a pump with an integral flow meter that accurately monitors the fluid flow rate through the pump.

Another goal of the present invention is to provide a pump with an integral flow meter that accurately monitors the fluid flow regardless of fluid viscosity.

An additional goal of the present invention is to provide a pump with an integral flow meter that functions independently of the pump so as to monitor fluid flow rates independent of the rate of pump operation.

Another goal of the present invention is to provide a flow meter with gears that minimize leakage of fluid between the meshed gears.

Yet another goal of the present invention is to provide a pump with an integral flow meter in a compact, rugged unit.

In accordance with one aspect of the present invention, a pump housing is provided with a conduit defined through the housing between a pump inlet and pump outlet. A pump device is disposed within the housing and in communication with the conduit to pump fluid therethrough. A fluid flow meter also is disposed within the housing and in communication with the conduit to monitor the flow rate of the fluid being pumped through the pump device. The flow meter generates signals related to the fluid flow rate which are fed back to a control device to control the flow rate through the pump device.

In another aspect of the present invention, the flow meter may be equipped with a pair of meshed modified elliptical gears. The modified elliptical gears are based on a true elliptical shape, with bulged portions added between the major and minor axes of the elliptical shape. The modified elliptical gears also have involute teeth that are relatively thick adjacent the minor axis and relatively thin adjacent the major axis. Such teeth configuration and modified elliptical shape permit a pair of gears that snugly mesh without gap throughout their rotation, effectively preventing leakage between the meshed gear teeth.

BRIEF DESCRIPTION OF THE DRAWINGS

FIG. 1 is a front elevational view of the integral pump and flow meter according to one embodiment of the present invention.

FIG. 2 is a side elevational view of the integral pump and flow meter of FIG. 1.

DETAILED DESCRIPTION

Figure 3:
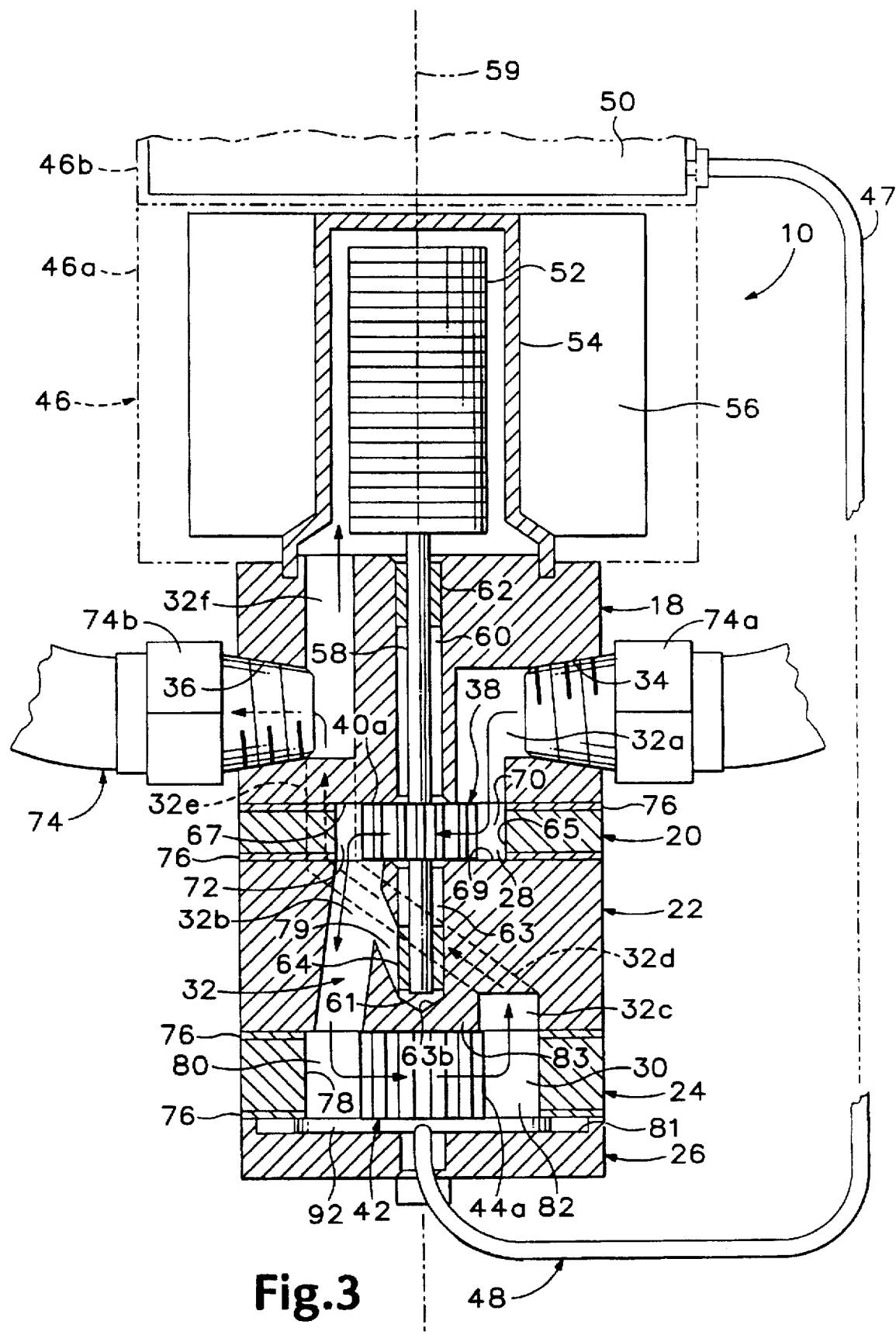
FIG. 3 is a view taken along line 3—3 of FIG. 2.

An integral pump and flow meter 10 according to one embodiment of the present invention is shown in FIGS. 1 and 2. The integral pump and flow meter includes a housing 11, which comprises a series of stacked disc elements 18, 20, 22, 24, 26. For purposes of description, disc element 26 defines the bottom of the housing.

The disc elements are individually formed or machined to define a pump cavity 28 (FIGS. 3, 4), a flow meter cavity 30 (FIGS. 3, 5), and a conduit 32 (FIG. 3) within the housing when the discs are stacked. The conduit 32 interconnects a pump inlet 34 and a pump outlet 36 defined in opposing sides of the housing. The conduit has opposing portions passing through the pump cavity 28 and flow meter cavity 30.

The pump cavity contains a pump device 38, which includes a pair of counterrotating spur gear members 40a, 40b. The flow meter cavity contains a flow meter device 42, which includes a pair of counterrotating modified elliptical gear members 44a, 44b. A pump motor 46 drives the pump device to pump fluid through the conduit 32.

An electric circuit 48 including a control device 50 mounted on top of the pump motor interconnects the flow meter device and the motor. The flow meter produces signals fed back to the control device to control the operation of the pump motor to precisely control the pump flow rate.

Turning to the details of the preferred embodiment, the pump motor 46 may be of a variety of constructions. One preferred embodiment of the pump motor is that described in U.S. Pat. No. 5,096,390 to Sevrain et al., which is incorporated by reference herein.

As shown in FIG. 3, such pump motor 46 includes motor housing 46a enclosing a permanent magnet rotor 52 with a plurality of permanent magnet dipoles radially spaced therearound. A fluid-tight cup enclosure 54 surrounds the rotor. A plurality of electric coils constituting stator windings 56 surround the cup. A control housing 46b mounted on top of the motor housing encloses the control device 50, which controllably applies pulses of current to the stator windings to produce a rotating magnetic field that causes the rotor 52 to rotate within cup 54. A drive shaft 58 extends from the rotor along a central axis 59 to drive the pump device 38.

Figure 4:
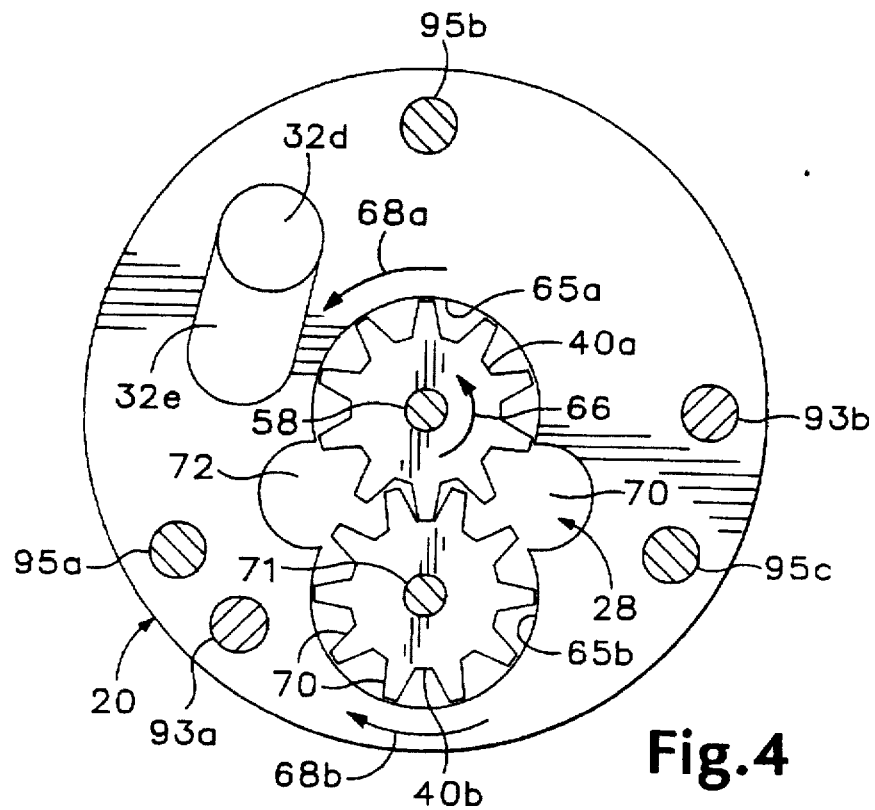
FIG. 4 is a view taken along line 4—4 of FIG. 1.

As shown in FIGS. 3 and 4, the drive shaft 58 extends through a first central bore 60 in disc element 18, and is supported by a journal bearing 62 mounted therein. The drive shaft extends through the pump cavity 28, and the distal end 61 of the shaft is received in a second central bore 63 that extends part-way through disc element 22. A journal bearing mount 64 is fitted near the bottom 63b of the second central bore and rotatably mounts the drive shaft, such that the shaft distal end 61 is spaced slightly from the bottom 63b of the bore.

The pump cavity 28 is defined by the bottom surface 67 of element 18, the upper surface 69 of disc element 22, and the sidewall 65 of the cavity is defined axially through disc element 20. As best shown in FIG. 4, the pump cavity sidewall includes arcuate portions 65a, 65b that closely hold the meshed pair of pump spur gears 40a, 40b. The pump cavity has an upstream portion 70 which is open to a first conduit portion 32a, and a downstream portion 72 open to a second conduit portion 32b. The first conduit portion 32a extends from the threaded pump inlet 34 defined in a first side of the disc element 18.

Spur gear 40a is fixedly mounted at its center to the drive shaft 58 for rotation within pump cavity 28 about axis 59. The rotation of spur gear 40a drives the counterrotation of meshed spur gear 40b about a shaft 71. Pumping occurs as the drive shaft 58 rotates in direction 66, which counterrotates the spur gears in directions 68a, 68b. Fluid from the upstream inlet side of the pump becomes sealingly trapped between the spur gear teeth 70 and the arcuate sidewall portions 65a, 65b as the gears counterrotate. The counterrotation of the spur gears pumps the trapped fluid along the sidewalls to the downstream portion 72 of the pump cavity.

Conduit portion 32b extends generally axially through disc element 22 to the flow meter cavity 30. A subconduit 79 extends angularly from conduit portion 32b and intersects the second central bore 63 adjacent the bore bottom 63b. The subconduit directs pressurized fluid to the bottom of the bore to provide hydrostatic support and lubrication for the drive shaft distal end 61.

Figure 5:
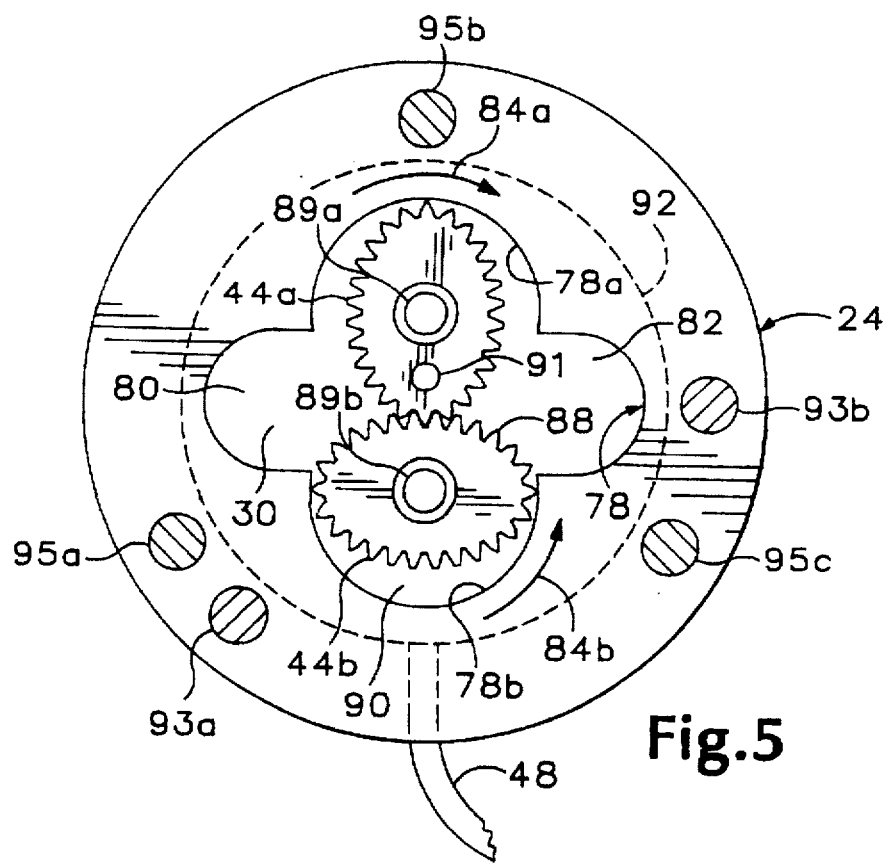
FIG. 5 is a view taken along line 5—5 of FIG. 1.

The flow meter cavity 30 is defined by the top surface 81 of disc element 26, the bottom surface 83 of disc element 22, and sidewalls 78 of the cavity formed axially throughout disc element 24. As best shown in FIG. 5, sidewalls 78 define an upstream cavity portion 80 (adjacent the outlet side of the housing) open to the conduit portion 32b, and a downstream cavity portion 82 open to conduit portion 32c. The flow meter cavity further has a central portion defined by arcuate sidewall portions 78a, 78b that closely receive the ends of the meshed modified elliptical meter gears 44a, 44b as they counterrotate.

Figure 6:
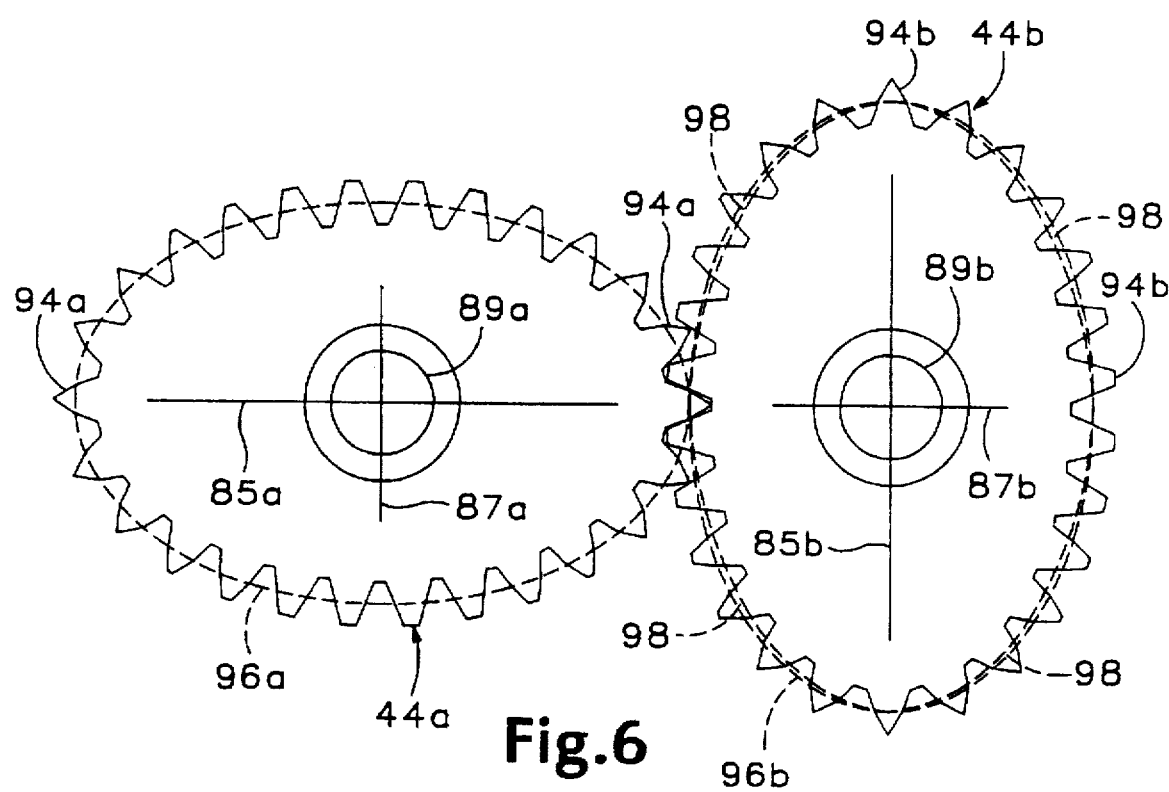
FIG. 6 is an enlarged view of the flow meter gears of FIG. 5 in accordance with another aspect of the present invention.

As shown in FIGS. 5 and 6, each modified elliptical meter gear 44a, 44b respectively has a major axis 85a, 85b and a minor axis 87a, 87b. The meter gears 44a, 44b are rotatably mounted at their centers on respective shafts 89a, 89b which extend axially across the flow meter cavity. The shafts 89a, 89b are substantially coplanar with the drive shaft 58 and spur gear shaft 71 (see FIGS. 4 and 5). The gears are meshed such that the major axes of the gears pass through a perpendicular orientation at 90° intervals. The details of the modified elliptical meter gears will be described below.

The pumped fluid flow powers the counterrotation of the modified elliptical meter gears 44a, 44b in respective directions 84a, 84b. For instance, in the gear positions shown in FIG. 5, high upstream fluid pressure in the cavity inlet portion 80 acts upon the entire length of gear 44a. Thus, no net torque is applied to gear 44a. However, the high fluid pressure acts upon only one-half of gear 44b, creating a moment arm that rotates gear 44b about shaft 89b. The rotation of gear 44b drives both gears 44a, 44b in counterrotation. Accordingly, fluid trapped in a crescent-shaped space 90 between the length of gear 44b and sidewall 78b is moved to the downstream portion 82 of the flow meter cavity.

Once gear 44b has rotated 90° from the position shown in FIG. 5, the above-described torque application is reversed, and gear 44a drives the counterrotation of the gears. Thus, with a single 360° rotation of the meter gears, four of the crescent-shaped fluid volumes 90 pass to the downstream portion 82 of the flow meter chamber. Since all fluid pumped through the pump device also passes through the flow meter device, knowledge of the meter gear rotation rate and crescent volume 90 can be used to accurately indicate the flow rate through the pump.

As shown in FIGS. 3 and 5, the flow meter has mechanism for producing varying signals related to the fluid flow rate. A magnet 91 is mounted on meter gear 44a to rotate therewith, and a magnetic sensor 92 is mounted on top surface 81 of disc element 26 beneath meter gear 44a. Sensor 92 senses each rotation of the gear as a magnetic pulse, which is output as a signal to circuit 48.

As shown in FIG. 3, the electrical circuit 48 includes a wire 47 that connects to control device 50 mounted within the housing adjacent the pump motor. While the wire is depicted as exterior to the housing, the wire 47 may alternatively be routed completely within the housing.

The control device 50 may include an electronics module of conventional design. The control device receives the meter gear rotation signals from the flow meter, and converts such signals into a fluid flow rate by the following equation: (number of pulse signals/time unit)×(4×volume of crescent space 90).

To maintain a selected pump flow rate, the control device 50 may be configured to be set at the selected pump flow rate. The control device then increases the pump motor operation rate when the measured flow rate is less than the selected flow rate, and decreases the pump operation rate when the measured flow rate is greater than the selected flow rate.

Returning to the description of the fluid flow conduit, the downstream portion 82 of the flow meter cavity opens into a grooved conduit portion 32c defined in the bottom surface 83 of disc member 22 (FIGS. 2 and 3). Conduit portion 32c is defined to extend aft (i.e., away from the viewer in FIG. 3) from the downstream portion 82 of the flow meter cavity. Conduit portion 32c opens into diagonal conduit portion 32d, which extends diagonally upward through disc element 22. The diagonal conduit portion is positioned aft of the second central bore 63. The diagonal portion 32d opens at the top surface 69 of element 22 into a slot-like conduit portion 32e defined throughout disc element 20. Conduit portion 32e extends forward (i.e., toward the viewer in FIG. 3) from diagonal conduit portion 32d to open into an outlet conduit portion 32f, which is defined axially throughout disc element 18. Housing outlet 36 intersects outlet conduit portion 32f. Outlet conduit portion 32f also may open into the space between rotor 52 and cup 54 to direct fluid into this space for thermal purposes.

The disc elements are held in stacked alignment by a first and a second alignment pin 93a, 93b that extend through alignment bores defined in the disc elements 18, 20, 22, 24, 26. The housing is secured together by three clamping screws 95a, 95b, 95c received into screw bores defined at 120° intervals about the disc elements.

To seal the pump and flow meter cavities against leakage, gasket seals 76 are sandwiched respectively between disc elements 18 and 20, 20 and 22, 22 and 24, and 24 and 26.

The assembled integral pump and flow meter device 10 may be installed in a fluid line 74 by threaded inlet and outlet fittings 74a, 74b being respectively screwed into pump inlet and outlet 34, 36.

MODIFIED ELLIPTICAL GEARS

Conventional elliptical gears will work adequately in the flow meter device of the present invention. However, the modified elliptical gears 44a, 44b, according to another aspect of the present invention, are preferred. The modified elliptical gears provide an accurate indication of flow rate over a broad range of viscosities and flow rates because they substantially eliminate fluid leakage between the teeth of the meshed meter gears. Thus, the need for meter recalibration for different fluid viscosities may be eliminated.

The modified elliptical gears are described in U.S. Pat. No. 5,545,781 of Charles F. Carr, filed on Jan. 11, 1994, which is incorporated by reference herein.

A pair of such modified elliptical gears is designated in FIG. 6 with reference numerals 44a and 44b. To simplify the discussion of the gears, each of the modified elliptical gears has exemplary parameters including a reference circular pitch diameter of 64 teeth per inch of circular diameter, a ratio of major to minor diameters of 1.54, 26 total teeth, a major pitch diameter of 0.4813 inch, and a minor pitch diameter of 0.3125 inch. It is to be understood that these parameters are exemplary only.

The present modified elliptical shape of the gears 44a, 44b avoids loose meshing by eliminating the gap that forms between meshed true elliptical gears. The gap in the elliptical gears occurs four times during every full rotation of the true elliptical gears, and is prominent in ranges around maximum values at 45°, 135°, 225°, and 315° rotation from an initial position, as illustrated in FIG. 6. The gap causes loose meshing by pulling the meshing teeth slightly apart. For example, a pair of true elliptical gears having the exemplary parameters discussed above, the gap has a maximum size of about 0.011 inch.

The geometry of the modified elliptical gear 44a is based on a modified elliptical pitch shape 96a. The pitch shape 96a is illustrated by either of the dashed shapes 96a, 96b in FIG. 6. The pitch shape 96a is defined by the imaginary shape on the modified elliptical gear 44a that rolls without slippage against the pitch shape 96b of a similar mating gear 44b. Thus, the pitch shape 96a ordinarily falls somewhere along the height of the gear teeth 94a.

As indicated in FIG. 6 on gear 44b, the pitch shape 96a is based upon a true elliptical shape, with the addition of four thin, crescent-like bulged portions 98 at positions between the major and minor axes 85a, 87a. The bulged portions 98 fatten the elliptical shape 24 to yield the modified elliptical shape 96a. The four bulged portions 98 are defined between the pitch shape 96b and a dashed shape 98b representing a true elliptical shape on gear 44b shown in FIG. 6. It is to be understood that the bulges are somewhat enlarged in order to be conveniently viewed.

With bulged portions 98 having a preferred thickness and shape, no gap will form between the meshed modified elliptical gears 44a, 44b. The modified elliptical pitch shape 96a preferably adds bulge functions $(|a_2 \sin^2 (2\theta)|)$ to the shape of a true ellipse (X=A cos θ, and Y=B sin θ). Thus, the modified pitch shape 22 is defined by the equation $X = A \cos \theta + |a_2 \sin^2 (2\theta)| \cos \theta$, and $Y = B \sin \theta + |a_2 \sin^2 (2\theta)| \sin \theta$. A is equal to the minor radius of the true ellipse. B is equal to the major radius of the true ellipse. θ is equal to the angle from the minor axis 87a, X is equal to the dimension from the major axis 90a to a point on the pitch shape 96a defined by θ, and Y is equal to the dimension from the minor axis to the same point on the pitch shape. The functions $|a_2 \sin^2 (2\theta)|$ define the bulge portions 98, and $a_2$ is equal to what is termed the "bulge factor."

For the exemplary modified elliptical gear, an optimal bulge factor is around 0.0055 inch. The bulge reaches the 0.0055 inch maximum at the 45°, 135°, 225°, and 315° positions, and decreases on either side thereof to a zero bulge at the major and minor axis positions of 0°, 90°, 180°, and 270°. Such bulged portions 98 effectively eliminate the 0.011 inch gap between the true elliptical gears discussed above. It is to be understood that the bulge factor should vary proportionally with a variation in ellipse major and minor diameters.

The above equation for the modified elliptical pitch shape 96a works well with a range of major to minor diameter ratios. An alternative equation which produces workable modified elliptical pitch shapes is $X = A \cos \theta + |a_2 \sin (2\theta)| \cos \theta$, and $Y = B \sin \theta + |a_2 \sin (2\theta)| \sin \theta$.

In addition to closing the gap, snug gear meshing is provided by varying the shape of the involute gear teeth 94a from the major axis 85a to the minor axis 87a. The gear teeth 94a on the flat sides of the pitch shape 96a adjacent the minor axis 87a are thicker measured circumferentially of the gear than the gear teeth adjacent the major axis 85a. The gear teeth 94a adjacent the minor axis are relatively flat-sided and flat-topped. The gear teeth 94a on the narrow ends of the pitch shape adjacent the major axis are relatively smaller and shorter, with more side curvature. The flat tops 97 of teeth adjacent the minor axis avoid interference with the root surfaces 99 between the shorter teeth 94b on the narrow end of the meshed gear. Such varying tooth configuration yields snug gear meshing through a full rotation of the gears.

The incorporated U.S. Pat. No. 5,545,781 of Charles F. Carr describes methods for making such modified elliptical gears. In general, a computer is used to rotate a simulated hobbing rack around the modified elliptical shape to form a gear contour. A computer controlled machining means or the like then uses the gear contour to cut such a modified elliptical gear from a blank, or cut a form within which such a gear may be cast.

The foregoing has been described in connection with a preferred embodiment. However, it will be appreciated by one of ordinary skill in the art that various modifications and variations may be substituted the mechanisms described herein while remaining defined by the appended claims and their equivalents.

What is claimed is:

1. A pump, comprising:
   a pump housing defining an inlet and an outlet;
   a conduit defined by the housing and extending between the inlet and the outlet to define a fluid flow path through the housing;
   a pump device positioned within the housing and in communication with the conduit to propel fluid through the conduit; and
   a fluid flow meter positioned within the housing and in communication with the conduit to measure the flow rate of fluid pumped through the conduit by the pump device, the fluid flow meter comprising first and second elliptical gears on respective rotational meter axes and being intermeshed with each other for counterrotation with respect to each other as urged by fluid propelled through the conduit by the pump device, the first elliptical gear having a major axis that passes through a perpendicular orientation relative to a major axis of the second elliptical gear at every 90° of rotation of said elliptical gears, the elliptical gears being modified from a true elliptical profile to substantially eliminate gaps between the meshed elliptical gears as the elliptical gears counterrotate.

2. A pump according to claim 1, wherein the inlet and outlet are disposed on opposite sides of the housing.

3. A pump according to claim 1, wherein the pump device has at least one pump member rotatable about a pump member axis, the pump member axis and the rotational meter axes being substantially parallel to each other.

4. A pump according to claim 3, wherein the pump device has two pump members respectively rotatable about first and second pump member axes, the first and the second pump member axes and the first and the second rotational meter axes being disposed substantially in a common plane.

5. A pump according to claim 3, wherein the conduit extends perpendicular to the pump member axis through the pump device and extends perpendicular to the rotational meter axes through the fluid flow meter.

6. A pump according to claim 5, wherein the inlet and outlet are disposed on opposite sides of the housing, the flow across the pump member is from the inlet side of the housing toward the outlet side, and the flow across the fluid flow meter is from the outlet side of the housing toward the inlet side.

7. A pump according to claim 1, wherein the pump device comprises at least one rotating pump member positioned across the conduit, drivingly connected to a rotatable drive shaft held in the housing by a mount.

8. A pump according to claim 7, wherein a subconduit extends from the conduit to the mount, the subconduit being adapted to route fluid to the mount.

9. A pump according to claim 1, further comprising:
   a pump motor operably connected to the pump device to drive the pump device; and
   a control device operably connected to the flow meter and to the pump motor, the control device receiving fluid flow rate data from the flow meter, and the control device controlling the pump motor speed based on the fluid flow rate data.

10. A pump according to claim 1, wherein a magnet is connected to the first elliptical gear for rotation therewith, and a magnetic field sensor is positioned adjacent the magnet, the magnetic field sensor operable to sense variation in the magnetic field as the first elliptical gear rotates to sense rotation of the first elliptical gear.

11. A pump according to claim 1, wherein the pump housing is comprised of a plurality of stacked elements, each element being selectively formed such that the stacked elements together define a pump cavity, a flow meter cavity, and the conduit within the housing.

12. A pump according to claim 1, wherein the first and second elliptical gears are modified from a true elliptical profile by bulges in respective pitch shapes of the first and second elliptical gears, the bulges being located between major and minor axes of the respective pitch shapes.

13. A pump according to claim 12, wherein the first and second elliptical gears have teeth, the teeth near the major axis of the respective pitch shapes of the first and second elliptical gears being relatively smaller in the circumferential direction, and the teeth near the minor axis of the respective pitch shapes of the first and second elliptical gears being relatively larger in the circumferential direction.

14. A pump comprising:
   a pump device having a variable operation rate and a flow meter operable to produce varying signals related to the flow rate produced by the pump device, the pump device and flow meter being housed adjacent each other within a pump housing, the flow meter comprising first and second elliptical gears intermeshed with each other for counterrotation with respect to each other as urged by fluid propelled past the first and second elliptical gears through the housing by the pump device, the first elliptical gear having a major axis that passes through a perpendicular orientation relative to a major axis of the second elliptical gear at every 90° of rotation of said elliptical gears, the elliptical gears being modified from a true elliptical profile to substantially eliminate any gap between the meshed elliptical gears as the elliptical gears counterrotate;
   an electric circuit interconnecting the flow meter and pump device; and
   a control device connected to the electric circuit, with signals from the flow meter indicating pump flow rate being fed from the control device to the pump device to control the pump operation rate.

15. A pump according to claim 14, wherein the control device is operable to compare a selected flow rate with the pump flow rate indicated by the signals from the flow meter, the control device being operable to signal the pump device to increase pump operation rate when the selected flow rate is greater than the sensed pump flow rate, and operable to signal the pump device to decrease the operation rate when the selected flow rate is less than the sensed pump flow rate.

16. A pump according to claim 14, wherein the control device is mounted within the pump housing.

17. A pump according to claim 14, wherein the first and second elliptical gears are modified from a true elliptical profile by bulges in respective pitch shapes of the first and second elliptical gears, the bulges being located between major and minor axes of the respective pitch shapes.

18. A pump according to claim 17, wherein the first and second elliptical gears have teeth, the teeth near the major axis of the respective pitch shapes of the first and second elliptical gears being relatively smaller in the circumferential direction, and the teeth near the minor axis of the respective pitch shapes of the first and second elliptical gears being relatively larger in the circumferential direction.

19. A pump according to claim 17, wherein the teeth near the major axes of the pitch shapes of the intermeshed elliptical gears are relatively thinner and the teeth near the minor axes of the pitch shapes of the intermeshed elliptical gears are relatively thicker.

20. A pump comprising:
a housing with a conduit extending therethrough, the conduit having first and second opposing portions;
a pump device disposed within the housing adjacent the first portion; and
a flow meter disposed within the housing adjacent the second portion, the flow meter comprising a pair of intermeshed elliptical gears modified from a true elliptical shape so as to eliminate a gap tending to arise when major axes of the intermeshed elliptical gears are parallel, wherein the pump device is mounted on a drive shaft having an end rotatably mounted at a mount positioned between the pump device and the flow meter.

21. A pump according to claim 20, wherein a subconduit extends from the conduit at a position between the first and second conduit portions, the subconduit intersecting the drive shaft mount to direct fluid to the mount.

22. A pump according to claim 17, wherein the intermeshed elliptical gears each have pitch shapes having major and minor axes, the elliptical gears being modified from a true elliptical shape by the addition to the pitch shapes of bulges between the major and minor axes.

23. A pump, comprising:
(a) a pump housing defining an inlet, an outlet, and a conduit extending and defining a fluid flow path through the pump housing connecting the inlet with the outlet;
(b) a pump device enclosed within the housing and in communication with the conduit downstream of the inlet to propel liquid through the conduit, the pump device comprising plural pump members rotatable about respective pump member axes; and
(c) a fluid flow meter positioned within the housing and in communication with the conduit downstream of the pump device but upstream of the outlet to measure the flow rate of fluid propelled through the conduit by the pump device, the fluid flow meter comprising plural meter members respectively rotatable about first and second meter member axes as urged by the fluid propelled by the pump device, the pump member axes and the meter member axes being substantially parallel to each other and disposed substantially in a common plane.

24. The pump of claim 23, wherein the conduit extends perpendicularly to the pump member axes through the pump device, and perpendicularly to the meter member axes through the fluid flow meter.

25. The pump of claim 24, wherein the inlet and outlet are disposed on opposite sides of the housing, the flow across the pump member being from the inlet side of the housing toward the outlet side, and the flow across the fluid flow meter being from the outlet side of the housing toward the inlet side.

26. The pump of claim 23, wherein the pump housing comprises, in order, plural stacked elements, wherein a first stacked element defines the inlet and outlet, a second stacked element defines a pump cavity for the pump device, a third stacked element defines a conduit portion from the pump device to the fluid flow meter and from the fluid flow meter to the outlet, a fourth stacked element defines a fluid flow meter cavity for the fluid flow meter.

27. The pump of claim 23, further comprising a sensor for sensing rotation of the metering gears.

28. A pump, comprising:
(a) a housing defining a conduit extending therethrough, the conduit having first and second opposing portions;
(b) a pump device disposed within the housing adjacent the first portion, the pump device comprising plural pump members rotatable about respective pump member axes; and
(c) a flow meter disposed within the housing adjacent the second portion, the pump device further comprising a drive shaft having an end rotatably mounted at a mount positioned between the pump device and the flow meter, and the flow meter comprising plural meter members respectively rotatable about first and second meter member axes that are parallel to each other and to the pump member axes and disposed in a common plane.

29. The pump device of claim 28, wherein a subconduit extends from the conduit at a position between the first and second conduit portions, the subconduit intersecting the drive shaft mount to direct fluid to the mount.

30. A pump and flow sensor combination, comprising:
a pump housing having an inlet and an outlet and an inside surface;
a pump drive shaft connectable to a motor outside said pump housing and penetrating said pump housing;
a first gear and a second gear within said pump housing and enmeshed for opposite rotation, said first gear connected to said pump drive shaft for driven rotation therewith, said first and second gears being closely journaled partially by said inside surface of said pump housing and arranged to receive fluid from said inlet on a demeshing side of said first and second gears;
third and fourth gears arranged in said pump housing downstream of said first and second gears, said third and fourth gears enmeshed and closely journaled partially by said inside surface of said pump housing, a demeshing side of said third and fourth gears receiving flow from an enmeshing side of said first and second gears, and an enmeshing side of said third and fourth gears open to said outlet of said pump housing; and
said third and fourth gears driven by fluid pumped by said first and second gears; and
a sensor means for sensing a rotational speed of said third gear for determining the flow rate of liquid pumped by said first and second gears.

31. The pump and flow sensor combination according to claim 30, wherein said sensor means comprises a noncontact sensor.

32. The pump and flow sensor combination according to claim 31, wherein said noncontact sensor comprises a magnet mounted on said third gear and a magnet sensor mounted to said pump housing.

* * * * *